(12) United States Patent
Aldrey et al.

(10) Patent No.: US 9,094,652 B2
(45) Date of Patent: *Jul. 28, 2015

(54) METHODS AND SYSTEMS FOR FACILITATING MIGRATION OF A USER ACCOUNT FROM A FIRST DIGITAL VIDEO RECORDING ("DVR") SYSTEM TO A SECOND DVR SYSTEM

(71) Applicant: Verizon Patent and Licensing Inc., Arlington, VA (US)

(72) Inventors: Raul I. Aldrey, Plano, TX (US); Donald H. Relyea, Dallas, TX (US); Venkata S. Adimatyam, Irving, TX (US); Kishore Tallapaneni, Flower Mound, TX (US); Michael R. Oliver, Hoboken, NJ (US); George M. Higa, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 234 days.

This patent is subject to a terminal disclaimer.

(21) Appl. No.: 13/731,571

(22) Filed: Dec. 31, 2012

(65) Prior Publication Data

US 2014/0186000 A1    Jul. 3, 2014

(51) Int. Cl.
*H04N 5/765* (2006.01)
*H04N 5/76* (2006.01)
*H04N 21/258* (2011.01)
*H04N 21/2747* (2011.01)

(52) U.S. Cl.
CPC ......... *H04N 5/765* (2013.01); *H04N 21/25866* (2013.01); *H04N 21/2747* (2013.01)

(58) Field of Classification Search
CPC .............................. H04N 5/76; H04N 5/765
USPC .................................. 386/200, 291, E5.002
See application file for complete search history.

(56) References Cited

U.S. PATENT DOCUMENTS

2008/0002951 A1* 1/2008 Russ et al. .................... 386/124

* cited by examiner

*Primary Examiner* — Thai Tran
*Assistant Examiner* — Syed Hasan

(57) ABSTRACT

An exemplary method includes a digital video recording ("DVR") data migration management system 1) receiving a request for a user account to migrate from being associated with a first DVR system to being associated with a second DVR system, 2) accessing a first DVR data set associated with the first DVR system and separate from data representative of a library of one or more media content assets stored by the first DVR system, 3) generating a second DVR data set based on the first DVR data set and in accordance with one or more attributes of the second DVR system, and 4) associating the second DVR data set with the second DVR system. Corresponding methods and systems are also disclosed.

23 Claims, 11 Drawing Sheets

DVR Data Migration Assistant

The following programs were recorded by your current DVR system in SD. Please indicate which ones you want to switch to HD after you migrate to the new DVR system:

| Program | SD | HD |
|---|---|---|
| Program A | ✓ | ☐ |
| Program B | ✓ | ☐ |
| Program C | ☐ | ✓ |
| Program D | ☐ | ✓ |
| Program E | ✓ | ☐ |
| Program F | ☐ | ✓ |

Cancel   Save

Fig. 7

DVR Data Migration Assistant

Your current DVR system has multiple recordings of the following programs. Please indicate which programs you want to keep only one recording of after you migrate to the new DVR system:

☑ Program A
☑ Program B
☐ Program C
☐ Program D

Cancel
Save

METHODS AND SYSTEMS FOR FACILITATING MIGRATION OF A USER ACCOUNT FROM A FIRST DIGITAL VIDEO RECORDING ("DVR") SYSTEM TO A SECOND DVR SYSTEM

BACKGROUND INFORMATION

Digital video recording ("DVR") systems allow users to record media content assets (e.g., television programs, etc.) and then view or otherwise experience the recorded media content assets. For example, a user may use a DVR system to schedule a recording of a particular television program, after which the DVR system may record the television program and allow the user to play back the recorded television program in a time-shifted manner.

Over time, a DVR system may record and store (e.g., within a hard drive) an extensive library of media content assets. The DVR system may also store DVR data associated with the library of media content assets. The DVR data may include metadata descriptive of the media content assets, data representative of settings (e.g., recording instructions provided by the user, recording conflict resolution rules, etc.) of the DVR system, and/or data representative of business logic used by the DVR system to implement the various recording instructions provided by the user and/or any other operation performed by the DVR system.

Unfortunately, if the user desires to upgrade or otherwise switch to a new DVR system, the user typically has to program the new DVR system from scratch. For example, the user may have to provide a whole new set of recording instructions to the new DVR system and interact extensively with the new DVR system for the new DVR system to "learn" (i.e., develop the appropriate business logic) the tendencies and/or preferences of the user. This process can be tedious, time consuming, and daunting for the user, especially if the new DVR system has a different interface than the previous DVR system.

Moreover, it may be difficult or even impossible for the user to rebuild the library of media content assets that he or she had recorded on the previous DVR system. For example, the user may have to manually identify each media content asset that had been recorded and then manually determine how to acquire each media content asset (e.g., by searching within an electronic program guide for a rebroadcast of a particular media content asset and then directing the new DVR system to record the media content asset when it is rebroadcast). In addition to being tedious and time consuming for the user, this process may be futile for some media content assets if they are not scheduled to for rebroadcast.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 7-8 show exemplary graphical user interfaces in accordance with the methods and systems described herein.

DETAILED DESCRIPTION OF PREFERRED EMBODIMENTS

Figure 1:
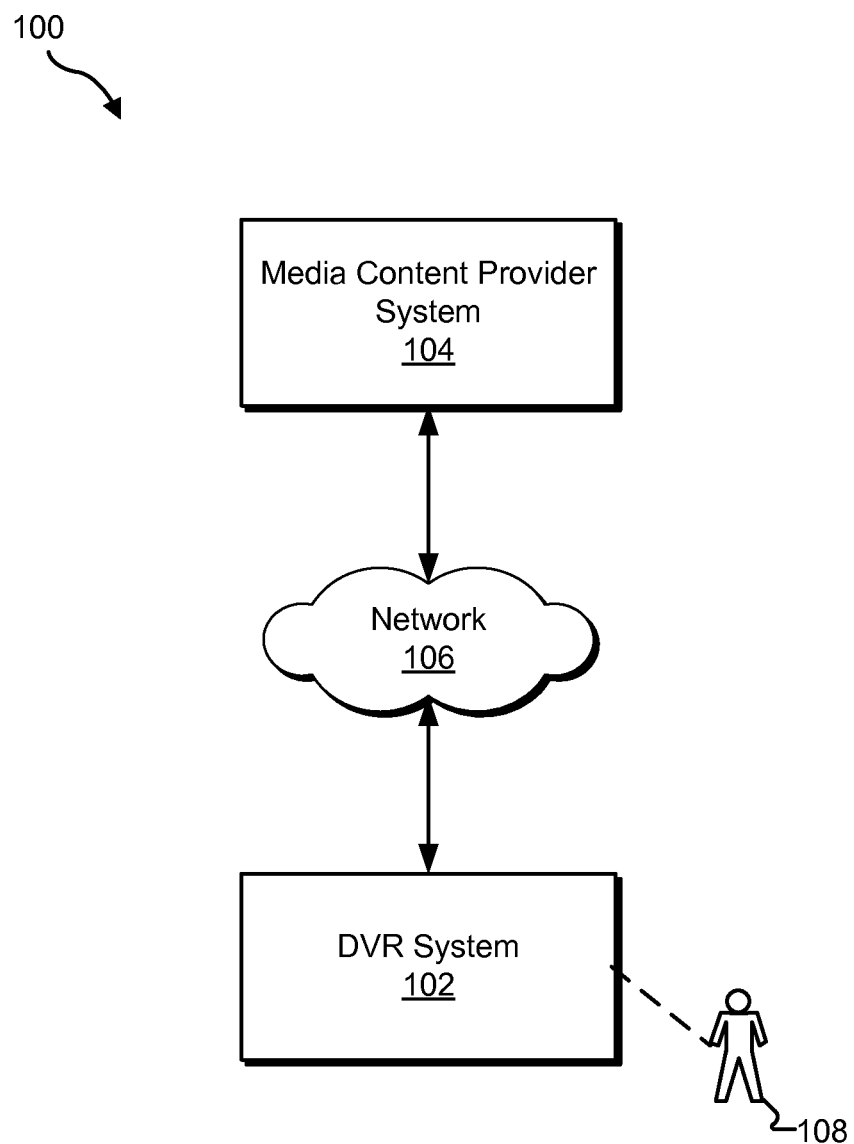
FIG. 1 illustrates an exemplary configuration in which a DVR system is communicatively coupled to a media content provider system according to principles described herein.

Methods and systems for facilitating migration of a user account from being associated with a first DVR system to being associated with a second DVR system are described herein. As will be described below, a DVR data migration management system may 1) receive a request for a user account to migrate from being associated with a first DVR system to being associated with a second DVR system, 2) access a first DVR data set associated with a library of one or more media content assets stored by the first DVR system, 3) generate a second DVR data set based on the first DVR data set and in accordance with one or more attributes of the second DVR system, and 4) associate the second DVR data set with the second DVR system.

As used herein, a "media content asset" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a DVR system.

The terms "DVR data" and "DVR data set" may refer to any data associated with (e.g., maintained and/or used by) a DVR system. In some examples, the DVR data may be separate from data representative of a library of media content assets stored by the DVR system (i.e., one or more data files representative of each media content asset included in the library of media content assets). For example, a DVR data set associated with a DVR system that the user has used over a period of time to acquire (e.g., record) a library of media content assets may include metadata descriptive of one or more characteristics of the media content assets, data representative of settings of the DVR system (e.g., recording instructions provided by the user to acquire the media content assets, recording conflict resolution rules, etc.), and/or data representative of business logic used by the DVR system to implement the various recording instructions provided by the user and/or any other operation performed by the DVR system.

Various benefits may be realized in accordance with the methods and systems described herein. For example, a user may desire to upgrade or otherwise migrate from using a first DVR system to using a second DVR system. To this end, the DVR data migration management system may access a first DVR data set associated with the first DVR system, generate a second DVR data set based on the first DVR data set and in accordance with one or more attributes of the second DVR system, and associate the second DVR data set with the second DVR system. The second DVR system may then operate (e.g., record media content assets, identify media content assets included in the library of media content assets stored by the first DVR device, ascertain one or more tendencies and/or preferences of the user, and/or acquire one or more media content assets included in the library of media content assets maintained by the first DVR system) in accordance with the second DVR data set without the user having to manually program the new DVR from scratch. Other benefits that may be realized in accordance with the methods and systems will be made apparent herein.

FIG. 1 illustrates an exemplary configuration 100 in which a DVR system 102 is communicatively coupled to a media content provider system 104. As will be described below, various components of the DVR data migration management system described herein may be implemented by DVR system 102 and/or media content provider system 104.

DVR system 102 and media content provider system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

DVR system 102 and media content provider system 104 may communicate using any suitable network. For example, as shown in FIG. 1, DVR system 102 and media content provider system 104 may be configured to communicate with each other by way of network 106. Network 106 may include one or more networks or types of networks capable of carrying communications and/or data signals between DVR system 102 and media content provider system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Media content provider system 104 may be associated with a service provider (e.g., a subscriber television service provider, an Internet service provider, a DVR service provider, etc.), a media content asset provider (e.g., ESPN, NBC, etc.), and/or any other type of media content provider. Accordingly, media content provider system 104 may be configured to provide one or more media content services (e.g., DVR services, television services, video-on-demand services, Internet services, electronic program guide services, etc.) to DVR system 102 and/or to users by way of DVR system 102. For example, media content provider system 104 may be configured to manage (e.g., maintain, process, distribute, and/or generate) media content assets and/or electronic program guide data configured to be delivered to DVR system 102. Media content provider system 104 may be implemented by one or more computing devices (e.g., one or more servers associated with one or more entities) as may serve a particular implementation.

DVR system 102 may facilitate access by one or more users to media content (e.g., media content assets) provided by media content provider system 104. For example, DVR system 102 may present and/or record media content assets at the direction of one or more users. To this end, DVR system 102 may include one or more tuners. Each tuner may be configured to be tuned to a particular media content asset at the direction of DVR system 102 and/or at the direction of a user of DVR system 102. This may be performed in any suitable manner. For example, a tuner may tune to a media content asset by tuning to a media content channel carrying the media content asset. Additionally or alternatively, a tuner may tune (e.g., switch) to a digital stream of data packets (e.g., Internet Protocol ("IP") based data packets) carrying the media content asset. Hence, as used herein, a "tuner" may be implemented by one or more hardware components and/or one or more software components.

In some examples, DVR system 102 may be associated with a user account maintained by and/or otherwise corresponding to one or more users (e.g., user 108 shown in FIG. 1). For example, the user may associate his or her user account with DVR system 102 by subscribing to a DVR service provided by way of DVR system 102, registering the user account with DVR system 102 (e.g., by logging in to DVR system 102), and/or in any other manner.

In some examples, DVR system 102 may be provided and/or otherwise managed by a media content provider and/or a service provider associated with media content provider system 104. For example, DVR system 102 may be provided by a particular subscriber television service provider. As will be described below, a user may in some instances desire to switch subscriber television service providers, which may necessitate a corresponding switch in the particular DVR system to which the user is associated.

DVR system 102 may be implemented by any suitable combination of media content processing or computing devices ("processing devices"). For example, DVR system 102 may be implemented by one or more local processing devices each associated with the same user account (i.e., processing devices that the user interacts with directly such as set-top box devices, DVR devices, receivers, personal computers, mobile devices (e.g., mobile phones and/or tablet computers), personal-digital assistant devices, gaming devices, television devices, etc.). Each processing device may include a storage device configured to store data associated with the processing device and one or more processors configured to perform the operations described herein.

Figure 2:
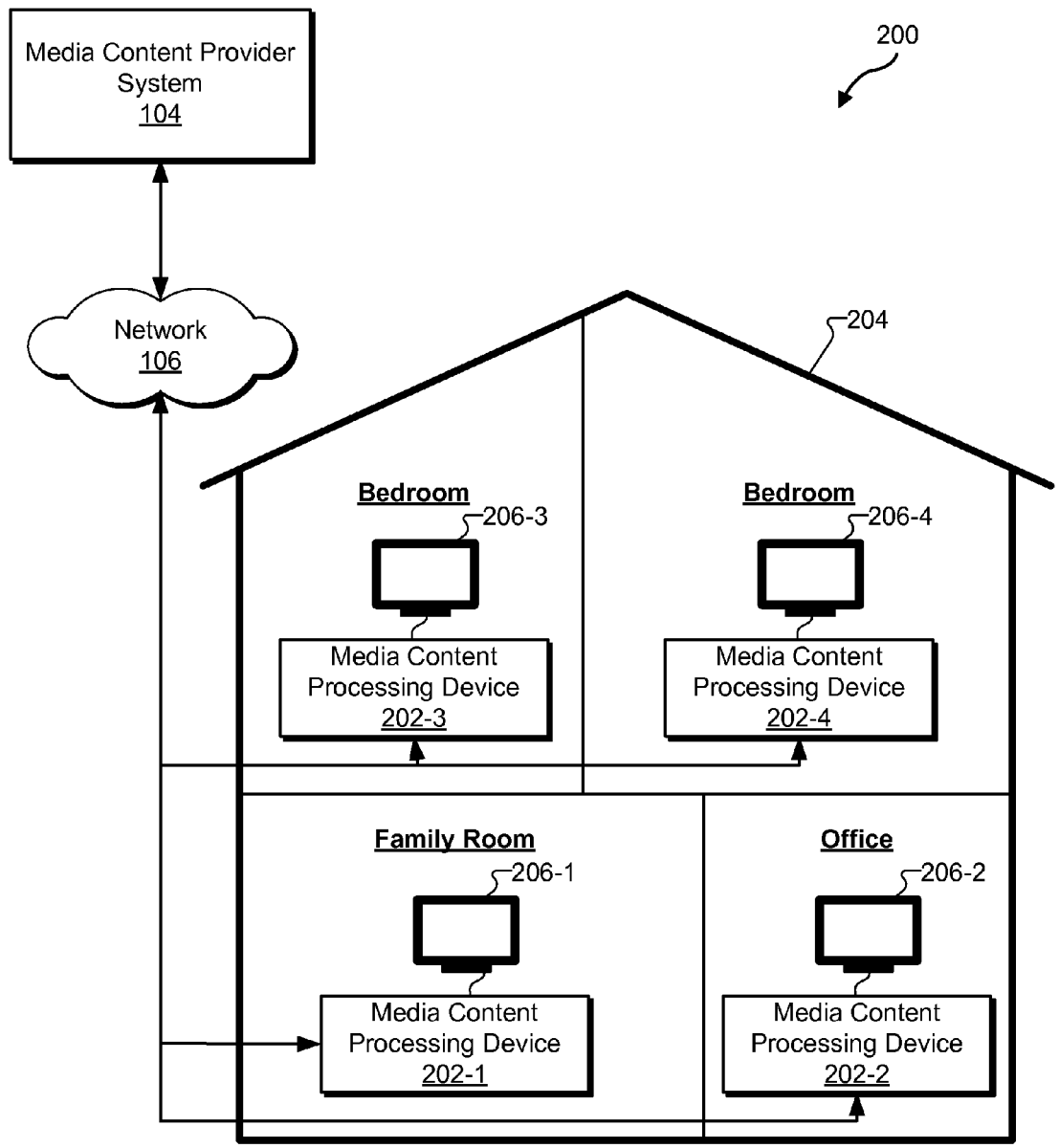
FIG. 2 shows an exemplary implementation of a DVR system according to principles described herein.

To illustrate, FIG. 2 shows an exemplary implementation 200 of DVR system 102 in which DVR system 102 is implemented by a plurality of media content processing devices 202 (e.g., media content processing devices 202-1 through 202-4) located within a particular premises 204 (e.g., a home). Each media content processing device 202 may be implemented by one or more of the local processing devices described herein. For example, each media content processing device may be implemented by a set-top box device having DVR capabilities.

As shown, media content processing device 202 may be distributed throughout premises 204. For example, FIG. 2 shows that media content processing devices 202 are distributed throughout various rooms of premises 204. In this manner, users located within premises 204 may experience and/or otherwise interact with media content at various locations throughout premises 204.

Media content processing devices 202 may each be associated with (e.g., connected to) a display 206 (e.g., displays 206-1 through 206-4). Displays 206 may include any suitable display device separate from media content processing devices 202 (e.g., televisions, computer monitors, etc.) and/or any suitable display device integrated into media content processing devices 202 (e.g., display screens). Media content processing devices 202 may be configured to present media content by way of displays 206.

As shown, each media content processing device 202 may be communicatively coupled to media content provider system 104 by way of network 106. This may be realized in any suitable manner.

Figure 3:
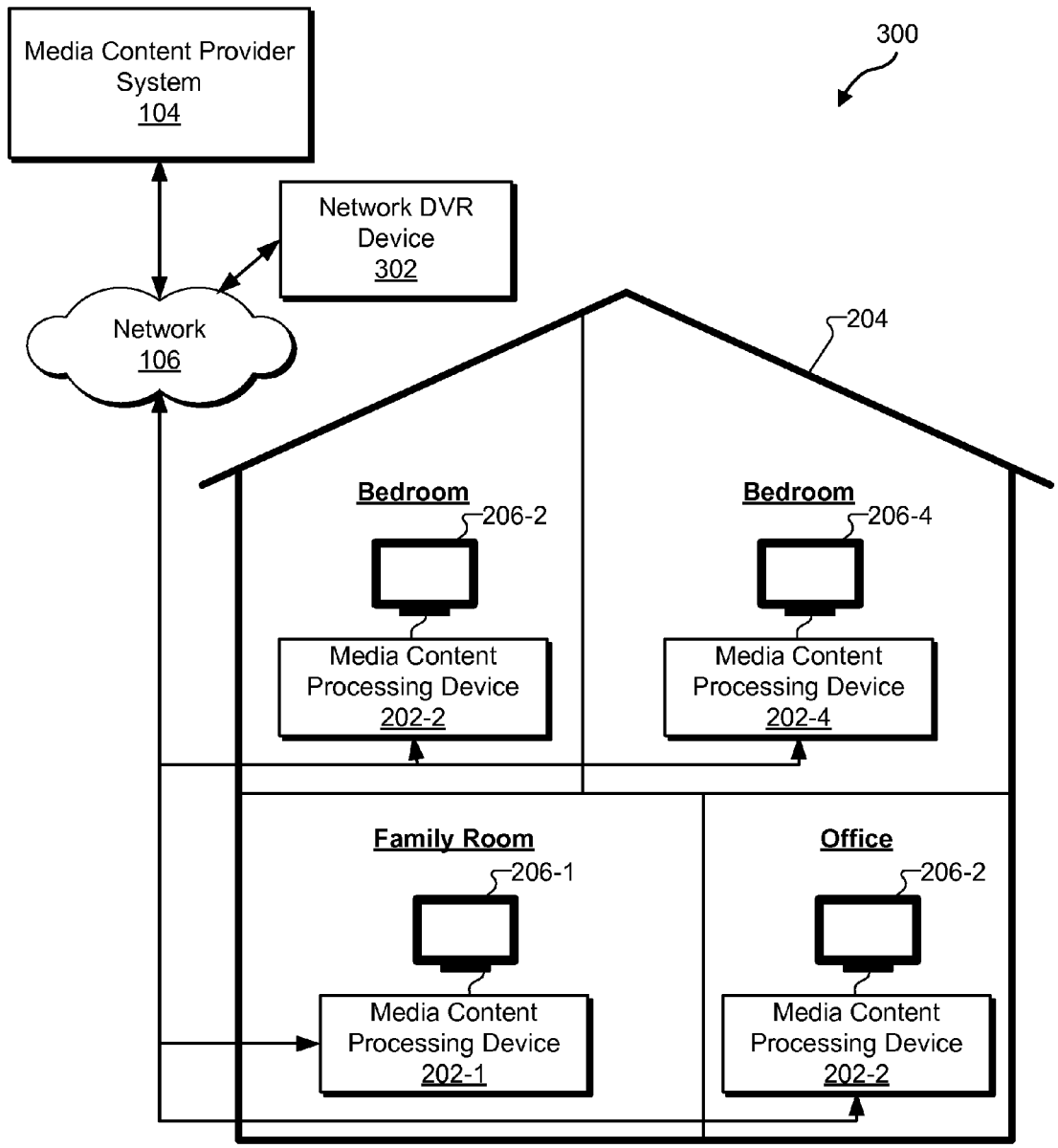
FIG. 3 shows another exemplary implementation of a DVR system according to principles described herein.

DVR system 104 may additionally or alternatively be implemented by one or more remote processing devices. For example, FIG. 3 shows another exemplary implementation 300 of DVR system 102 in which DVR system 102 is at least partially implemented by a network DVR device 302. Network DVR device 302 may be implemented by one or more computing devices (e.g., one or more servers) configured to provide DVR services.

As shown, network DVR device 302 may be remote from premises 204 and may be configured to communicate with media content processing devices 202 and media content provider system 104 by way of network 106. In this implementation, network DVR device 302 may perform one or more DVR operations traditionally performed by local DVR devices. For example, network DVR device 302 may record and/or store media content assets, stream media content assets to media content processing devices 202, and/or perform any other DVR operation as may serve a particular implementation. Each media content processing device 202 may be configured to interface with network DVR device 302 such that one or more users located within premises 204 may direct network DVR device 302 to perform one or more DVR operations.

In some examples, network DVR device 302 may be associated with and/or maintained by a media content provider and/or a service provider associated with media content provider system 104. For example, network DVR device 302 may be located at a premises maintained by a subscriber television service provider.

Figure 4:
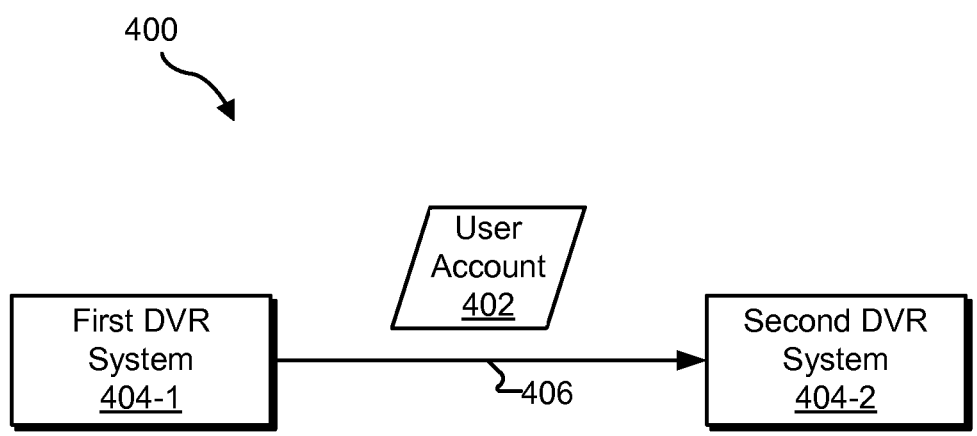
FIG. 4 illustrates an exemplary scenario in which a user account migrates from being associated with a first DVR system to being associated with a second DVR system according to principles described herein.

FIG. 4 illustrates an exemplary scenario 400 in which a user account 402 migrates from being associated with a first DVR system 404-1 to being associated with a second DVR system 404-2. The migration is represented in FIG. 4 by arrow 406. First and second DVR systems 404-1 and 404-2 (collectively "DVR systems 404") may be similar to DVR system 102 and may be implemented in any of the ways described herein.

Various situations may arise in which it is desirable for user account 402 to migrate from being associated with first DVR system 404-1 to being associated with second DVR system 404-2, as shown in FIG. 4. For example, a user associated with user account 402 may desire to upgrade from using first DVR system 404-1 (e.g., a legacy DVR system with limited storage capacity and/or other limited features) to using second DVR system 404-2 (e.g., a new DVR system with relatively more storage capacity and/or relatively enhanced features).

Additionally or alternatively, the user may desire to consolidate the number of processing devices that he or she uses. For example, the user may desire to switch from using multiple set-top box devices (e.g., multiple set-top box devices that implement first DVR system 404-1) each with a relatively small storage capacity to using a single set-top box device (e.g., a single set-top box device that implements second DVR system 404-2) that has a relatively large storage capacity.

Additionally or alternatively, the user may desire to switch from a first DVR service provider (e.g., a first subscriber television service provider) associated with (e.g., that provides) first DVR system 404-1 to a second DVR service provider (e.g., a second subscriber television service provider) associated with (e.g., that provides) second DVR system 404-2.

In each of these cases, second DVR system 404-2 may have a different set of attributes (e.g., capabilities) than first DVR system 404-1. For example, second DVR system 404-2 may have a different storage capacity than first DVR system 404-1, have different recording and/or processing capabilities than first DVR system 404-1, present a different interface than first DVR system 404-1, present different menu options than first DVR system 404-1, etc.

Figure 5:
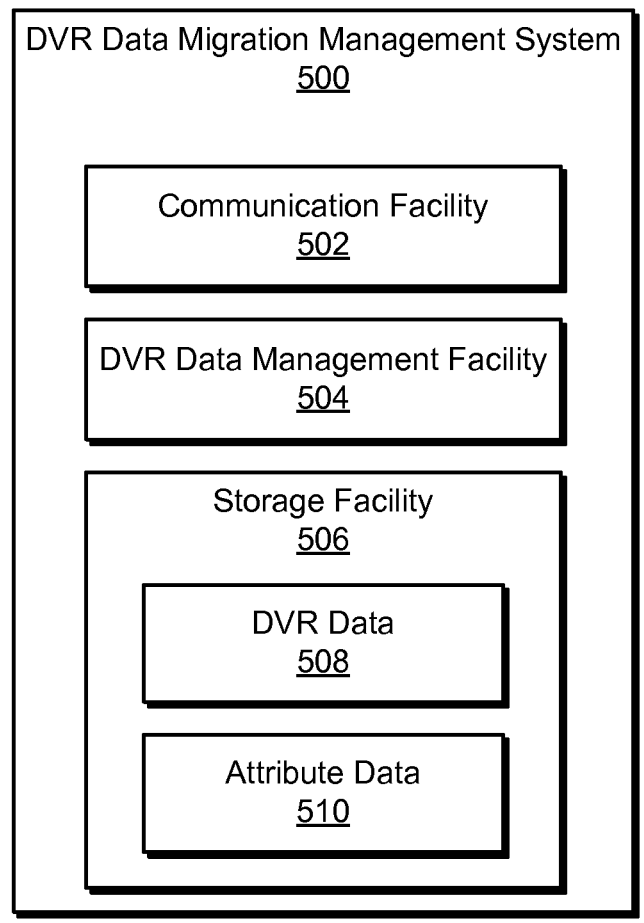
FIG. 5 illustrates an exemplary DVR data migration management system according to principles described herein.

FIG. 5 illustrates an exemplary DVR data migration management system 500 ("system 500") configured to facilitate migration of a user account from being associated with a first DVR system (e.g., first DVR system 404-1) to being associated with a second DVR system (e.g., second DVR system 404-2). As shown, system 500 may include, without limitation, a communication facility 502, a DVR data management facility 504, and a storage facility 506 selectively and communicatively coupled to one another. It will be recognized that although facilities 502-506 are shown to be separate facilities in FIG. 5, any of facilities 502-506 may be combined into fewer facilities, such as into a single facility, or divided into more facilities as may serve a particular implementation.

System 500 may be implemented by any suitable combination of computing devices and/or systems. For example, facilities 502-506 of system 500 may be implemented entirely by media content provider system 104, by a server not associated with media content provider system 104, by a DVR system (e.g., second DVR system 404-2), and/or by any other device and/or system. Alternatively, facilities 502-506 of system 500 may be distributed across any combination of these systems and/or devices.

Communication facility 502 may be configured to receive a request for a user account to migrate from being associated with a first DVR system to being associated with a second DVR system. This may be performed in any suitable manner. For example, communication facility 502 may receive a request for the user account to upgrade or otherwise switch from the first DVR system to the second DVR system. As another example, communication facility 502 may receive the request by detecting a registration of the user account with the second DVR system.

DVR data management facility 504 may be configured to perform one or more DVR data management operations. For example, in response to a request for a user account to migrate from being associated with a first DVR system to being associated with a second DVR system (a "migration request"), DVR data management facility 504 may access a first DVR data set associated with the first DVR system. In some alternative examples, DVR data management facility 504 may access the first DVR data set, at least partially, prior to the migration request. As described above, the DVR data set may be separate from data representative of a library of media content assets stored by the DVR system.

DVR data management facility 504 may access the first DVR data set associated with the first DVR system in any suitable manner. For example, in some cases, the first DVR data set is stored by the first DVR system. In these cases, DVR data management facility 504 may access the first DVR data set by directing the first DVR system to upload the first DVR data set to system 500. Alternatively, DVR data management facility 504 may access the first DVR data set by accessing the first DVR data set directly from the first DVR system (e.g., by analyzing the first DVR data set stored by the first DVR system without requiring the first DVR system to first upload the first DVR data set to system 500).

DVR data management facility 504 may additionally or alternatively access at least a portion of the first DVR data set from a computing system other than the first DVR system. For example, a media content provider, an electronic program guide provider, and/or any other entity may maintain at least a portion of the first DVR data set on a server or the like that is remote from the first DVR system. In this case, DVR data management facility 504 may acquire at least a portion of the first DVR data set from one or more of these sources.

DVR data management facility 504 may be further configured to generate a second DVR data set based on the first DVR data set and in accordance with one or more attributes of the second DVR system. The second DVR data set may be generated in any suitable manner. For example, the second DVR data set may be generated by modifying the first DVR data set in accordance with the one or more attributes of the second DVR system.

Figure 6:
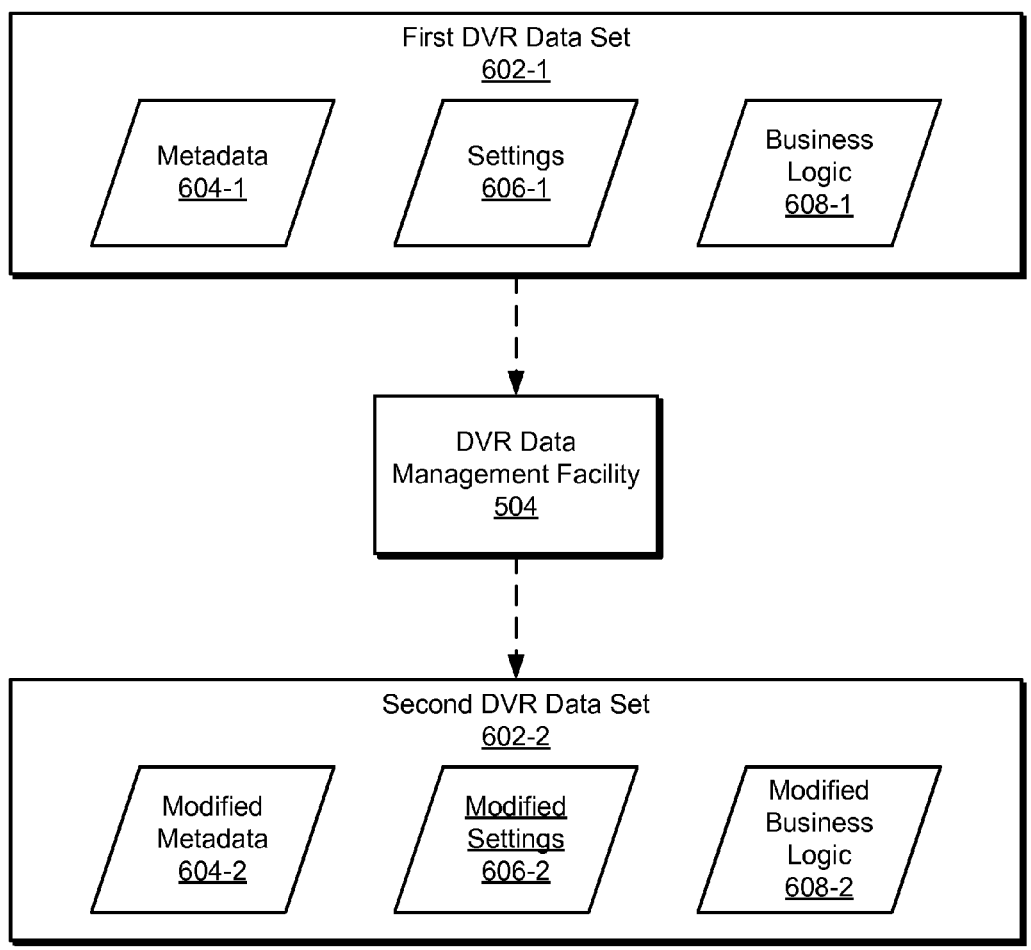
FIG. 6 illustrates an exemplary generation of a second DVR data set based on a first DVR data set according to principles described herein.

To illustrate, FIG. 6 illustrates an exemplary generation of a second DVR data set 602-2 based on a first DVR data set 602-1 that may be performed by DVR data management facility 504. As shown, first DVR data set 602-1 may include metadata 604-1, settings data 606-1, and business logic data 608-1 associated with one or more operations performed by the first DVR system. It will be recognized that first DVR data set 602-1 may include only one or more of these types of data and/or any other type of data as may serve a particular implementation. Metadata 604-1, settings data 606-1, and business logic data 608-1 will now be described in more detail.

Metadata 604-1 may include any data descriptive of one or more attributes of the media content assets included in the library of media content assets stored by the first DVR system. For example, metadata 604-1 may include, but is not limited to, time data, physical location data, user data, source data, destination data, size data, creation data, modification data, access data (e.g., play counts), and/or any other data descriptive of the media content assets. For example, metadata associated with a television program may include a title of the television program, a name of one or more people associated with the television program (e.g., actors, directors, producers, creators, etc.), a rating of the television program (e.g., user ratings, critic ratings, etc.), a synopsis of the television program, a setting of the television program, a theme of the television program, a format of the television program, a quality (e.g., resolution) of the television program, a size of the television program, a time or date associated with the television program (e.g., time or date of production, time or date of release, etc.), a color content of the television program, a bit rate of the television program, a compression amount of the television program, a codec associated with the television program, and/or any other information corresponding to the television program as may serve a particular application. Metadata corresponding to other types of media content assets may include additional or alternative information.

Settings data 606-1 may be representative of one or more settings of the first DVR system. Settings data 606-1 may be generated in response to user input. For example, settings data 606-1 may be representative of one or more recording instructions provided by the user and/or one or more recording conflict resolution rules specified by the user. To illustrate, settings data 606-1 may specify that the first DVR system is to record each episode of a television series scheduled to be broadcast over a period of time. Settings data 606-1 may additionally or alternatively be generated automatically by the first DVR system. For example, settings data 606-1 may be representative of one or more manners in which one or more options are presented to a user within an interface.

Business logic data 608-1 may be representative of business logic used by the first DVR system to implement the various operations performed by the first DVR system. For example, business logic data 608-1 may be representative of a manner in which the first DVR system handles the various recording requests provided by the user. To illustrate, business logic data 608-1 may specify a manner in which a recording conflict is handled by the first DVR system when the user provides a request to record a particular media content asset.

Business logic data 608-1 may be dynamically generated over time as the user interacts with the first DVR system. In this manner, the first DVR system may "learn" one or more tendencies and/or preferences of the user. For example, the first DVR system may recognize that the user likes to watch a particular genre of media content assets based on a viewing history of the user. The first DVR system may accordingly update its business logic data 608-1 and, based on this data, automatically recommend one or more media content assets in the same genre to the user.

In some examples, DVR data management facility 504 may generate second DVR data set 602-2 by modifying the data included in first DVR data set 602-1 in accordance with one or more attributes of the second DVR system. For example, as illustrated in FIG. 6, second DVR data set 602-2 may include modified metadata 604-2, modified settings data 606-2, and modified business logic data 608-2. Modified metadata 604-2 may include a modified version of metadata 604-1 that takes into account the one or more attributes of the second DVR system. Likewise, modified settings data 606-2 may include a modified version of settings data 606-1 that takes into account the one or more attributes of the second DVR system, and modified business logic data 608-2 may include a modified version of business logic data 608-1 that takes into account the one or more attributes of the second DVR system. Various examples of modifying each of these types of data in accordance with one or more attributes of the second DVR system will now be described.

In some examples, DVR data management facility 504 may modify metadata 604-1 in accordance with one or more attributes of the second DVR system by updating metadata 604-1 to include one or more values specific to the second DVR system. For example, the user may have directed the first DVR system to record a standard definition ("SD") version of a particular media content asset in order to minimize the amount of storage space required to store the media content asset. Hence, the media content asset may have a metadata value representative of "SD." However, the second DVR system may have a relatively larger storage capacity than the first DVR system. Based on this, DVR data management facility 504 may update the metadata value that defines the resolution of the media content asset to be equal to high definition ("HD"). The updated metadata value may be included in modified metadata 604-2 of second DVR data set 602-2. Using this updated metadata value, the second DVR system may automatically acquire an HD version of the media content asset for inclusion within its library of media content assets instead of an SD version of the media content asset.

As another example, a particular media content asset stored by the first DVR system may have a metadata value that indicates that the media content asset is protected by a television network provider-specific digital rights management ("DRM") heuristic. DVR data management facility 504 may determine that the second DVR system is associated with a different television network provider and accordingly update the metadata value to indicate that the content asset is now associated with a DRM heuristic provided by the different network provider. Using this updated metadata value, the second DVR system may successfully present the media content asset once data representative of the media content asset is acquired by the second DVR system.

As another example, the first DVR system may include two instances of the same media content asset in its library of media content assets. To conserve storage space in the second DVR system, DVR data management facility 504 may modify the metadata associated with the two instances to indicate that only one instance of the media content asset should be acquired by the second DVR system.

DVR data management facility 504 may additionally or alternatively modify settings data 604-1 in accordance with one or more attributes of the second DVR system in any suitable manner. For example, a particular setting represented by settings data 606-1 may specify that the first DVR system is to record an SD version of each episode of a television series scheduled to be broadcast over a period of time. However, if the second DVR system has a relatively higher storage capacity than the first DVR system, DVR data management facility 504 may modify the setting for inclusion in settings data 606-2 to specify that the second DVR system is to record an HD version of each of the episodes.

As another example, a particular setting represented by settings data 606-1 may specify a manner in which the user may gain access to one or more features of the first DVR system. For example, the setting may specify that the user has to enter a username and password before being able to access a particular feature of the first DVR system. However, the second DVR system may utilize a facial recognition feature in granting access to one or more features of the second DVR system. Based on the fact that the user uses the username and password feature of the first DVR system, DVR data management facility 504 may determine that the user is likely interested in using the facial recognition feature provided by the second DVR system and enable the facial recognition feature accordingly.

DVR data management facility 504 may additionally or alternatively modify business logic data 604-1 in accordance with one or more attributes of the second DVR system in any suitable manner. For example, business logic represented by business logic data 608-1 may specify a manner in which a recording conflict is handled by the first DVR system when the user provides a request to record a particular media content asset. To illustrate, the first DVR system may have only two tuners. Business logic maintained by the first DVR system may specify a manner in which the user desires the first DVR system to handle recording conflicts that arise when both tuners are in use and the first DVR system receives an instruction to record another media content asset. However, the second DVR system may have more than two tuners. Hence, DVR data management facility 504 may modify the business logic for inclusion in business logic data 608-2 to account for the additional tuners.

As another example, DVR data management facility 504 may analyze business logic data 604-1 to determine one or more recording preferences of the user that were previously impossible to realize in light of limited capabilities of the first DVR system. For example, two users of the first DVR system (e.g., a husband and a wife) may be interested in different television series that both happen to be broadcast each week at the same time on different media content channels. The first user may provide instructions for the first DVR system to record the first user's preferred television series. The second user may subsequently provide instructions for the first DVR system to record the second user's preferred television series. Unfortunately, the first DVR system may only be capable of recording one media content asset at a time. Hence, the second user may receive a recording conflict when he or she provides his or her recording instructions. In response, the second user may have to forego recording his or her desired television series. Business logic data 604-1 may include data representative of this recording attempt by the second user. When the users decide to migrate to the second DVR system, which may have sufficient resources to record more than one media content asset at a time, DVR data management facility 504 may account for the additional resources by generating new and/or modified business logic that directs the second DVR system to simultaneously record the two different television series each time they are broadcast.

It will be recognized that in some alternative examples, one or more types of data included in first DVR data set 602-1 may not be modified by DVR management facility 504 during the generation of second DVR data set 602-2. For example, DVR data management facility 504 may determine that the same metadata, settings data, and/or business logic data included in first DVR data set 602-1 should be included in second DVR data set 602-2. To illustrate, DVR data management facility 504 may determine that it is unnecessary to modify the metadata included in first DVR data set 602-2. In these cases, DVR data management facility 504 may generate second DVR data set 602-2 by copying or otherwise replicating the metadata, settings data, and/or business logic data included in first DVR data set 602-1. Additionally or alternatively, DVR data management facility 504 may generate completely new metadata, settings data, and/or business logic data for inclusion in second DVR data set 602-2.

In some examples, DVR data management facility 504 may at least in part base the generation of the second DVR data set (e.g., second DVR data set 602-2) on input (i.e., feedback) provided by the user. For example, DVR data management facility 504 may provide one or more options associated with the generation of the second DVR data set for presentation within a GUI, detect a selection by a user of an option included in the one or more options presented within the GUI, and generate the second DVR data set in accordance with the option selected by the user.

To illustrate, FIG. 7 shows an exemplary GUI 700 that may be provided for presentation to the user and that may be used by the user to select one or more options associated with the generation of the second DVR data set. GUI 700 (and any of the other GUIs described herein) may be presented to the user in any suitable manner. For example, GUI 700 may be presented by the new DVR system as the new DVR system is being configured by the user, in a web browser, and/or in any other manner.

As shown in FIG. 7, GUI 700 may be presented when DVR data management facility 504 determines that a number of programs (e.g., programs A through F) were recorded by the first DVR system in SD. This may have been done because the first DVR system was not capable of recording in HD, because the user wanted to conserve storage space associated with the first DVR system, and/or for any other reason. However, based on the attributes of the second DVR system (e.g., the second DVR system may be capable of recording media content assets in HD and/or may have relatively more storage space than the first DVR system), DVR data management facility 504 may provide the user with an option to acquire HD versions of the recorded programs. For example, as shown in FIG. 7, the user has selected programs C, D, and F as programs that the user would like the second DVR system to acquire in HD. In response to these selections, DVR data management facility 504 may update metadata and/or any other type of DVR data associated with programs C, D, and F for inclusion in the second DVR data set so that the second DVR system will acquire HD versions of these programs.

As another example, FIG. 8 shows another GUI 800 that may be provided for presentation to the user and that may be used by the user to select one or more options associated with the generation of the second DVR data set. GUI 800 may be presented when DVR data management facility 504 determines that the first DVR system has stored multiple recordings of one or more media content assets. This may occur, for example, when the first DVR system is implemented by multiple DVR devices, each of which may have recorded the one or more media content assets. As shown in FIG. 8, an option to keep only one of the recordings of each of the identified media content assets may be presented within GUI 800. For example, FIG. 8 shows that the user has selected to keep only one recording of programs A and B. In response to the selections, DVR data management facility 504 may update metadata and/or any other type of DVR data associated with programs A and B for inclusion in the second DVR data set so that the second DVR system will only acquire one instance of programs A and B.

Returning to FIG. 5, once the second DVR data set is generated, DVR data management facility 504 may associate the second DVR data set with the second DVR system. This may be performed in any suitable manner. For example, DVR data management facility 504 may associate the second DVR data set with the second DVR system by transmitting the second DVR data set to the second DVR system for use by the second DVR system.

Additionally or alternatively, DVR data management facility 504 may associate the second DVR data set with the second DVR system by designating the second DVR data set for use by the DVR system. In this manner, the second DVR data set does not necessarily have to be transmitted to the second DVR system. Instead, system 500 and/or any other computing device separate from the second DVR system (e.g., a server maintained by a subscriber television service provider) may maintain the second DVR data set and use the second DVR data set to control one or more operations of the second DVR system.

Once the second DVR data set is associated with the second DVR system, the second DVR system may perform one or more operations in accordance with the second DVR data set. This may minimize or eliminate the need for the user to extensively program the second DVR system as the user begins to use the second DVR system.

For example, DVR data management facility 504 may direct the second DVR system to acquire at least one media content asset included in the library of media content assets stored by the first DVR system from a media content source in accordance with the second DVR data set. For example, DVR data management facility 504 may direct the second DVR system to use metadata included in the second DVR data set to identify a media content asset included in the library of media content assets, select a media content source configured to distribute the media content asset, and acquire (e.g., download or record) the media content asset from the selected media content source.

In some examples, the media content source from which the second DVR system acquires the media content asset may be different than the first DVR system. Acquiring a media content asset from a media content source other than the first DVR system as opposed to acquiring the media content source from the first DVR system directly (e.g., by migrating data representative of the media content asset) may be necessary in cases where the media content source stored by the first DVR system is protected using one or more DRM heuristics.

Alternatively, DVR data management facility 504 may acquire at least one media content asset included in the library of media content assets from a media content source for storage by the second DVR system in accordance with the second DVR data set. For example, a server implementing system 500 may use the second DVR data set to acquire a media content asset and then transmit data representative of the media content asset to the second DVR system for storage by the second DVR system.

In some examples (e.g., in scenarios in which the second DVR data set is transmitted to the second DVR system), the second DVR system itself may utilize the second DVR data set to automatically acquire one or more media content assets included in the library of media content assets stored by the first DVR. This may be performed in any suitable manner. For example, the second DVR system may use the second DVR data set to identify a media content asset included in the library of media content assets, select a media content source configured to distribute the media content asset, and acquire (e.g., download or record) the media content asset from the selected media content source.

Storage facility 506 may be configured to store DVR data 508 representative of one or more DVR data sets and attribute data 510 representative of one or more attributes of one or more DVR systems (e.g., second DVR system 404-2). Storage facility 506 may maintain additional or alternative data as may serve a particular implementation.

As mentioned, in certain examples, system 500 may be implemented entirely by the second DVR system. For example, system 500 may be implemented entirely by a single processing device. The processing device may include a storage device and a processor. The storage device may be configured to store data associated with (e.g., used by) the processing device. The processor may be configured to 1) detect a registration of a user account with the processing device, 2) determine that the user account was registered with a DVR system separate from the processing device prior to the registration, 3) access, in response to the determination, a DVR data set associated with the DVR system and separate from data representative of a library of one or more media content assets stored by the DVR system, 4) generate an additional DVR data set based on the DVR data set and in accordance with one or more attributes of the processing device, and 5) store the additional DVR data set in the storage device.

Figure 9:
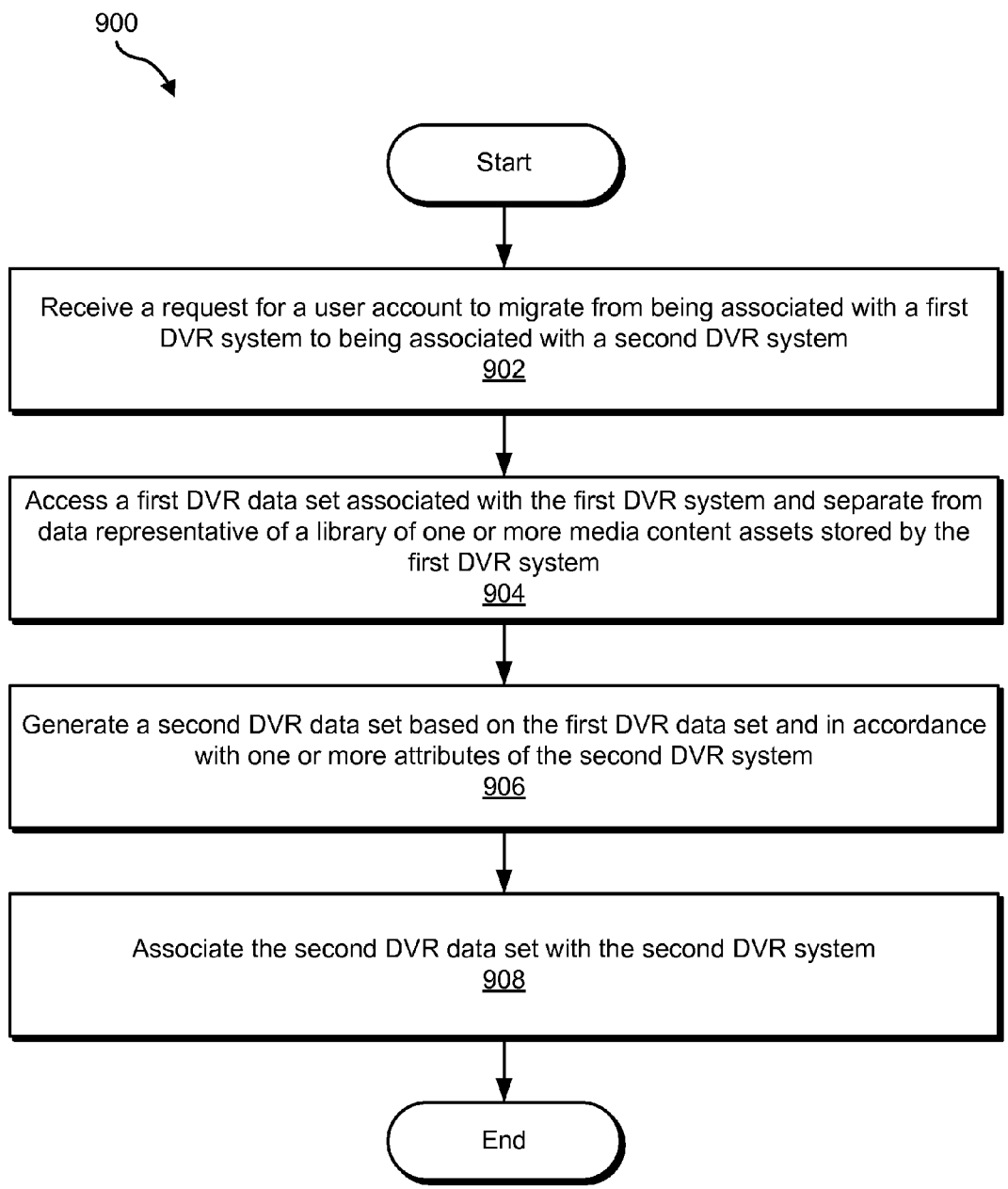
FIG. 9 illustrates an exemplary method of facilitating migration of a user account from being associated with a first DVR system to being associated with a second DVR system according to principles described herein.

FIG. 9 illustrates an exemplary method 900 of facilitating migration of a user account from being associated with a first DVR system to being associated with a second DVR system. While FIG. 9 illustrates exemplary steps according to one embodiment, other embodiments may omit, add to, reorder, and/or modify any of the steps shown in FIG. 9. One or more of the steps shown in FIG. 9 may be performed by DVR data migration management system 500 and/or any implementation thereof.

In step 902, a DVR data migration management system receives a request for a user account to migrate from being associated with a first DVR system to being associated with a second DVR system. Step 902 may be performed in any of the ways described herein.

In step 904, the DVR data migration management system accesses a first DVR data set associated with the first DVR system and separate from data representative of a library of one or more media content assets stored by the first DVR system. Step 904 may be performed in any of the ways described herein.

In step 906, the DVR data migration management system generates a second DVR data set based on the first DVR data set and in accordance with one or more attributes of the second DVR system. Step 906 may be performed in any of the ways described herein.

In step 908, the DVR data migration management system associates the second DVR data set with the second DVR system. Step 908 may be performed in any of the ways described herein.

Figure 10:
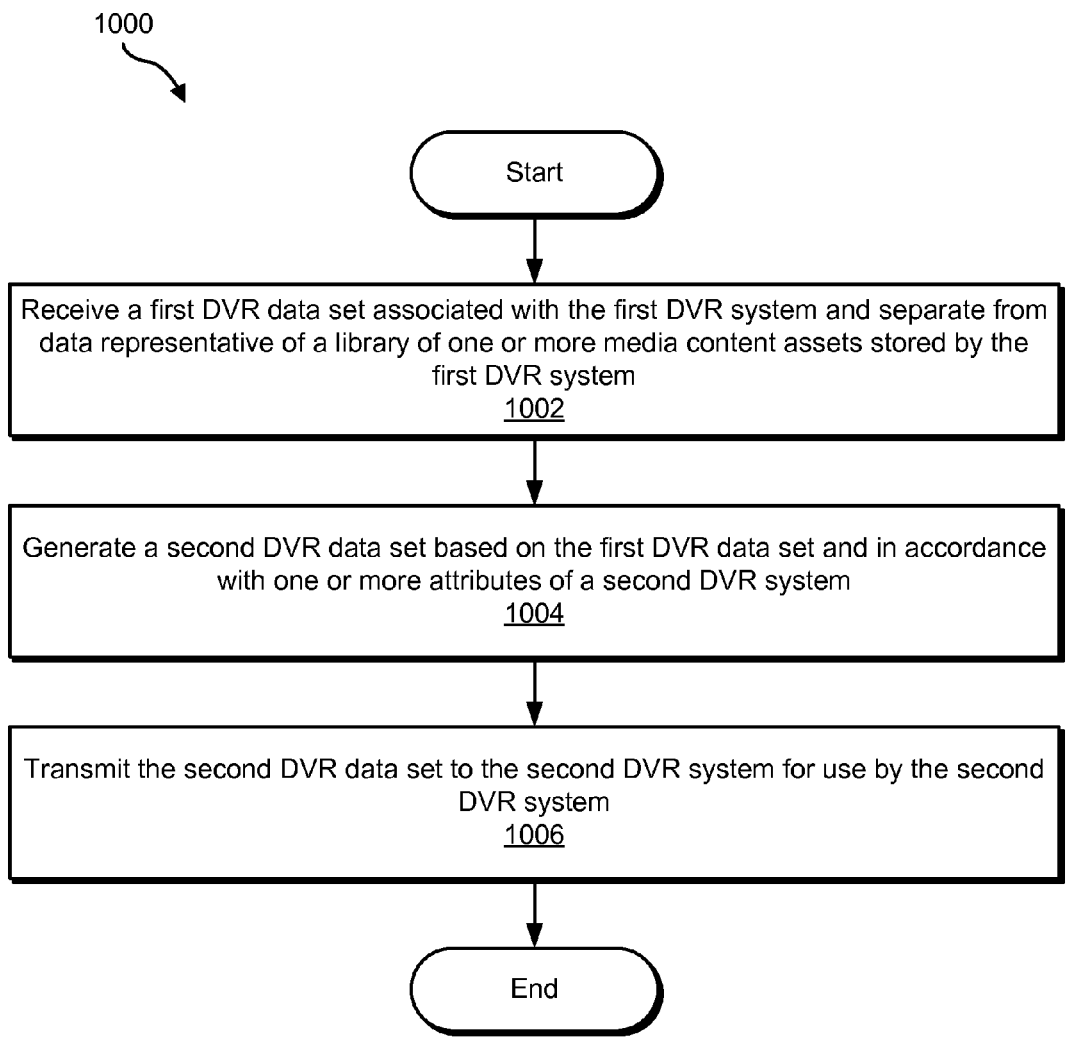
FIG. 10 illustrates another exemplary method of facilitating migration of a user account from being associated with a first DVR system to being associated with a second DVR system according to principles described herein.

FIG. 10 illustrates another exemplary method 1000 of facilitating migration of a user account from being associated with a first DVR system to being associated with a second DVR system. While FIG. 10 illustrates exemplary steps according to one embodiment, other embodiments may omit, add to, reorder, and/or modify any of the steps shown in FIG. 10. One or more of the steps shown in FIG. 10 may be performed by DVR data migration management system 500 and/or any implementation thereof.

In step 1002, a DVR data migration management system receives a first DVR data set associated with a first DVR system and separate from data representative of a library of one or more media content assets stored by the first DVR system. Step 1002 may be performed in any of the ways described herein.

In step 1004, the DVR data migration management system generates a second DVR data set based on the first DVR data set and in accordance with one or more attributes of a second DVR system. Step 1004 may be performed in any of the ways described herein.

In step 1006, the DVR data migration management system transmits the second DVR data set to the second DVR system for use by the second DVR system. Step 1006 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
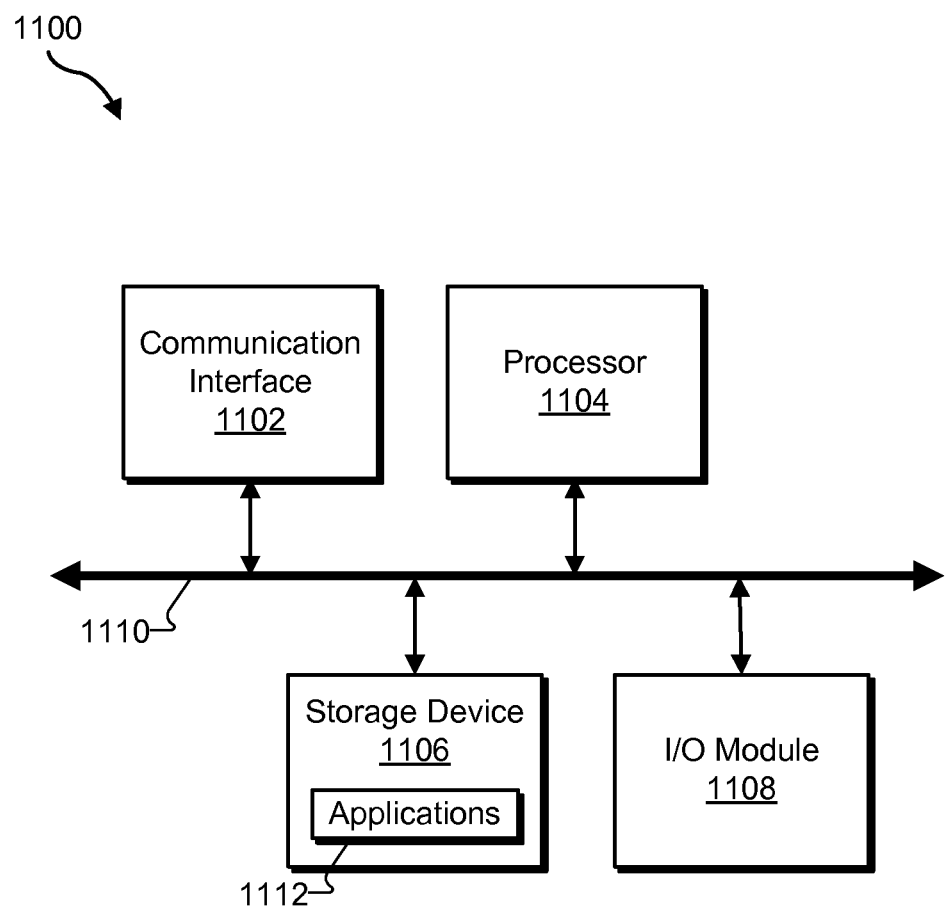
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1100. For example, one or more applications 1112 residing within storage device 1106 may be configured to direct processor 1104 to perform one or more processes or functions associated with communication facility 502 and/or DVR data management facility 504. Likewise, storage facility 506 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a digital video recording ("DVR") data migration management system, a request for a user account to migrate from being associated with a first DVR system to being associated with a second DVR system;
    accessing, by the DVR data migration management system, a first DVR data set associated with the first DVR system and separate from data representative of a library of one or more media content assets stored by the first DVR system;
    generating, by the DVR data migration management system, a second DVR data set based on the first DVR data set and in accordance with one or more attributes of the second DVR system; and
    associating, by the DVR data migration management system, the second DVR data set with the second DVR system.

2. The method of claim 1, wherein the accessing of the first DVR data set comprises directing the first DVR system to upload the first DVR data set to the DVR data migration management system.

3. The method of claim 1, wherein the first DVR data set is stored by the first DVR system, and wherein the accessing of the first DVR data set comprises accessing the first DVR data set directly from the first DVR system.

4. The method of claim 1, wherein the accessing of the first DVR data set comprises accessing the first DVR data set from a computing system other than the first DVR system.

5. The method of claim 1, wherein the first DVR data set comprises metadata associated with the library of one or more media content assets.

6. The method of claim 1, wherein:
    the first DVR data set comprises data representative of one or more settings of the first DVR data system; and
    the second DVR data set comprises data representative of a modified version of the one or more settings that takes into account the one or more attributes of the second DVR system.

7. The method of claim 1, wherein:
    the first DVR data set comprises data representative of business logic associated with one or more operations performed by the first DVR system; and
    the second DVR data set comprises data representative of a modified version of the business logic that takes into account the one or more attributes of the second DVR system.

8. The method of claim 1, wherein the generating of the second DVR data set comprises modifying the first DVR data set in accordance with the one or more attributes of the second DVR system.

9. The method of claim 1, wherein the generating of the second DVR data set comprises:
    providing one or more options associated with the generating of the second DVR data set for presentation within a graphical user interface;
    detecting a selection by a user of an option included in the one or more options presented within the graphical user interface; and
    generating the second DVR data set in accordance with the option selected by the user.

10. The method of claim 1, wherein the associating of the second DVR data set with the second DVR system comprises transmitting the second DVR data set to the second DVR system for use by the second DVR system.

11. The method of claim 1, wherein the associating of the second DVR data set with the second DVR system comprises designating the second DVR data set for use by the second DVR system.

12. The method of claim 1, further comprising directing, by the DVR data migration management system, the second DVR system to acquire at least one media content asset included in the library of media content assets from a media content source other than the first DVR system in accordance with the second DVR data set.

13. The method of claim 1, further comprising acquiring, by the DVR data migration management system, at least one media content asset included in the library of media content assets from a media content source other than the first DVR system for storage by the second DVR system in accordance with the second DVR data set.

14. The method of claim 1, wherein the first DVR system is associated with a first DVR service provider and the second DVR system is associated with a second DVR service provider different than the first DVR services provider.

15. The method of claim 1, wherein the receiving of the request for the user account to migrate from being associated with the first DVR system to being associated with the second DVR system comprises receiving a request for the user account to upgrade from the first DVR system to the second DVR system.

16. The method of claim 1, wherein the receiving of the request for the user account to migrate from being associated with the first DVR system to being associated with the second DVR system comprises detecting a registration of the user account with the second DVR system.

17. The method of claim 1, wherein the accessing, generating, and associating are performed in response to the receiving.

18. The method of claim 1, wherein the accessing is at least partially performed prior to the receiving.

19. The method of claim 1, embodied as computer-executable instructions on at least one non-transitory computer-readable medium.

20. A method comprising:
    receiving, by a digital video recording ("DVR") data migration management system, a first DVR data set associated with a first DVR system and separate from data representative of a library of one or more media content assets stored by the first DVR system;

generating, by the DVR data migration management system, a second DVR data set based on the first DVR data set and in accordance with one or more attributes of a second DVR system; and transmitting, by the DVR data migration management system, the second DVR data set to the second DVR system for use by the second DVR system.

21. The method of claim 20, embodied as computer-executable instructions on at least one non-transitory computer-readable medium.

22. A system comprising:

a communication facility configured to receive a request for a user account to migrate from being associated with a first digital video recording ("DVR") system to being associated with a second DVR system; and a DVR data management system communicatively coupled to the communication facility and configured to acquire a first DVR data set associated with the first DVR system and separate from data representative of a library of one or more media content assets stored by the first DVR system, generate a second DVR data set based on the first DVR data set and in accordance with one or more attributes of the second DVR system, and associate the second DVR data set with the second DVR system.

23. An apparatus comprising:

a storage device configured to store data associated with the apparatus; and a processor communicatively coupled to the storage device and configured to detect a registration of a user account with the apparatus, determine that the user account was registered with a digital video recording ("DVR") system separate from the apparatus prior to the registration, access, in response to the determination, a DVR data set associated with the DVR system and separate from data representative of a library of one or more media content assets stored by the DVR system, generate an additional DVR data set based on the DVR data set and in accordance with one or more attributes of the apparatus, and store the additional DVR data set in the storage device.

* * * * *